March 12, 1929.  W. F. WILLIAMS  1,704,995
BUMPER
Filed April 26, 1928
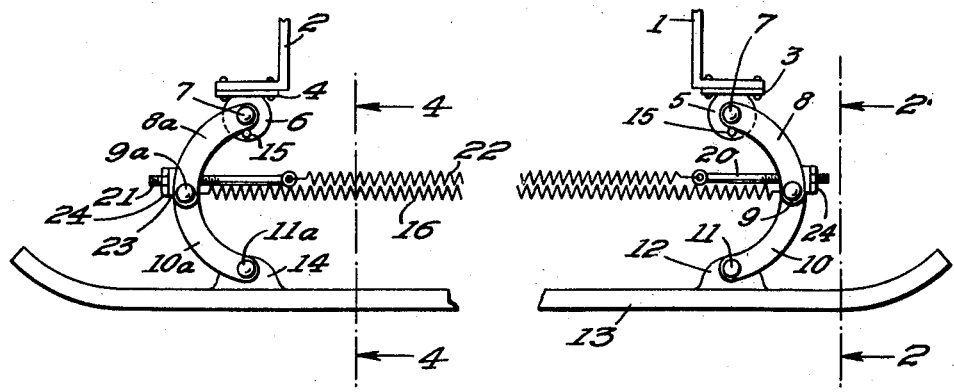
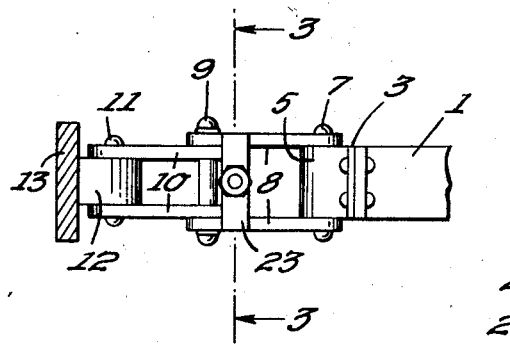
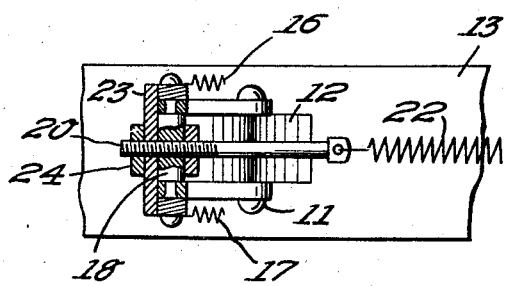
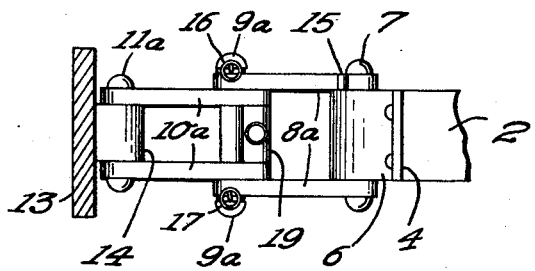
INVENTOR:
W. F. Williams
BY
H. J. Anders
ATTORNEY Patented Mar. 12, 1929.

1,704,995

UNITED STATES PATENT OFFICE.

WILLIAM F. WILLIAMS, OF CHICAGO, ILLINOIS.

BUMPER.

Application filed April 26, 1928. Serial No. 272,974.

This invention relates to improvements in bumpers for vehicles and more particularly to automobile bumpers. One object is to provide a bumper of moderate size and maximum resiliency having, therefore, maximum shock absorbing qualities. A further object is to provide a bumper provided with tension adjusting means. A further object is to provide a bumper adapted, upon receiving an impact, for movement either laterally or rearwardly or both laterally and rearwardly or for movement laterally at one end in one direction and then rearwardly and then laterally in the opposite direction and rearwardly. During all of these movements the impact or shock is being lessened in severity with the result that the damaging possibilities of the blow are materially lessened and the force of the blow spent or absorbed before actual contact with vulnerable portions of the vehicles are encountered.

More specifically the invention consists in the combination and arrangement of parts to be hereinafter fully described, pointed out in the claims and illustrated in the accompanying drawing which forms a part of this application for patent and in which—

Fig. 1 is a top plan view of the bumper with a portion of the buffer bar and springs eliminated.

Fig. 2 is an end view taken on line 2—2 of Fig. 1.

Fig. 3 is an enlarged fragmentary sectional view taken on line 3—3 of Fig. 2.

Fig. 4 is a cross sectional view taken on line 4—4 of Fig. 1.

Like reference characters denote corresponding parts throughout the several views.

The present invention comprises a buffer bar engaged and supported adjacent each end by two pairs of pivotally connected arcuate links which links are pivotally supported by a pair of bearing blocks connected by brackets to the vehicle or to the springs thereof, said sets of links being connected together by a plurality of springs.

The reference numerals 1, 2 denote a pair of brackets connected directly to the vehicle body, or to the springs thereof, and having secured thereto the plates or flanges 3, 4 of the cylindrical bearing blocks 5, 6 through the longitudinal center of each of which a pin 7 extends, the pin 7 of the block 5 pivotally connecting a pair of arcuate links 8 to the ends of said block, the ends of said links 8 remote from said block being pivotally connected by another pin 9 to a second pair of arcuate links 10 pivotally connected by bolt 11 to the boss 12 formed upon the buffer bar 13.

The pin 7 of block 6 connects a pair of arcuate links $8^a$ to said block while a pin $9^a$ connects said links $8^a$ to the links $10^a$ which at their opposite ends are pivotally connected by bolt $11^a$ to the boss 14 of buffer bar 13. The links 8, 10 are similar in all respects to the links $8^a$, $10^a$ except that they are curved in opposite directions and so made "rights and lefts". Each block 5 and 6 is provided with a stop pin 15 for the pair of links connected thereto.

Coil springs 16 and 17 connect the pins 9 and $9^a$ at opposite ends of said pins. The inner ends of the links 10 are connected together by the post 18 and the inner ends of the links $10^a$ by a similar post 19, said posts being formed respectively with transverse threaded perforations to receive the threaded adjustment bolts 20, 21, the inner ends of which are connected by the spring 22, each post having a span link 23 adapted to bear against the meeting ends of two pairs of links and each bolt being provided with the adjusting nuts 24.

By adjusting the bolts 20, 21 relative to each other the distance between their inner ends is varied, the spring 22 expanded more or less and the pressure of the span links 23 against the arcuate links varied.

When a blow is delivered against the buffer bar 13 it will most likely force one end thereof inwardly, while the bar moves inwardly and laterally, until the set of links connected thereto ride against the bar. A further movement of the buffer bar will force its opposite end inwardly and finally cause the sets of links at each end of the bar to fold together about the bolts 9, $9^a$ until the bolts 20, 21 are forced thereby against the bearing blocks 5, 6. This movement spreads the bolts 9, $9^a$ apart but when pressure against the buffer bar is relieved the springs will draw said bolts toward each other again thus moving the sets of links to normal position again, shown in Fig. 1, and again thrusting the buffer bar outward. The stop pins 15 prevent the links 8 and $8^a$ from being drawn toward each other into inoperative position by the springs. A movement of the buffer bar inwardly causes the sets of arcuate links at one side or at both sides of the bar to bow or fold together about the bolts 9 or 9ª or both. This movement causes the sets of links 8 or 8ª at their inner ends to ride out against the bar or bars 23 and force them outwardly against the tension of the springs thus causing the buffer to yieldingly resist the force of the impact and so cushioning the blow.

What is claimed is:—

1. In a bumper, a buffer bar, bearing blocks, sets of arcuate links at each end of said buffer bar pivotally connected together and adjustably connecting said buffer bar to said bearing blocks, springs connecting the common pivot pin of the sets of links at one end to the common pivot pin of the sets of links at the opposite end of said buffer bar, stop pins for said arcuate links carried by said bearing blocks, and tension adjusting mechanism connecting said sets of arcuate links.

2. In a bumper, a buffer bar, bearing blocks, sets of arcuate links at each end of said buffer bar pivotally connected together and adjustably connecting said buffer bar to said bearing blocks, the sets of arcuate links at opposite ends of said buffer bar being curved in opposite directions, springs connecting the common pivot pin of the sets of links at one end to the common pivot pin of the sets of links at the opposite end of said buffer bar, stop pins for said arcuate links carried by said bearing blocks, and tension adjusting mechanism connecting said sets of arcuate links.

3. In a bumper, a buffer bar, bearing blocks, sets of arcuate links at each end of said buffer bar pivotally connected together and adjustably connecting said buffer bar to said bearing blocks, springs connecting the common pivot pin of the sets of links at one end to the common pivot pin of the sets of links at the opposite end of said buffer bar, stop pins for said arcuate links carried by said bearing blocks, posts connecting the ends of one set of arcuate links of each pair, threaded bolts adjustably engaging said posts, a link carried by each threaded bolt for engagement with the inner ends of said arcuate links, nuts for said threaded bolts, and a spring connecting the inner ends of said threaded bolts.

In testimony that I claim the foregoing as my own I have hereto affixed my signature.

WILLIAM F. WILLIAMS.